(12) United States Patent
Lowy (10) Patent No.: US 10,300,607 B2
(45) Date of Patent: May 28, 2019

(54) ROBOTIC SYSTEMS AND METHODS (71) Applicant: OneMarket Network LLC, San Francisco, CA (US)

(72) Inventor: Joshua Lynton Lowy, San Francisco, CA (US)

(73) Assignee: OneMarket Network LLC, San Francisco, CA (US)

( * ) Notice: Subject to any disclaimer, the term of this patent is extended or adjusted under 35 U.S.C. 154(b) by 0 days.

(21) Appl. No.: 15/293,182

(22) Filed: Oct. 13, 2016

(65) Prior Publication Data

US 2017/0028564 A1 Feb. 2, 2017

Related U.S. Application Data (63) Continuation of application No. 14/946,635, filed on Nov. 19, 2015, now Pat. No. 9,527,217.
(Continued)

(51) Int. Cl.
B25J 13/00 (2006.01)
B25J 19/02 (2006.01)
(Continued)

(52) U.S. Cl.
CPC .............. *B25J 13/006* (2013.01); *B25J 5/00* (2013.01); *B25J 9/1664* (2013.01); *B25J 19/005* (2013.01); *B25J 19/021* (2013.01); *G05D 1/0246* (2013.01); *G05D 1/0274* (2013.01); *G06F 3/0488* (2013.01); *G06Q 10/08* (2013.01); *G06Q 30/0601* (2013.01); *G06Q 30/0617* (2013.01); *G06T 1/0014* (2013.01); *H04N 5/225* (2013.01); *H04N 5/23238* (2013.01); *G05D 2201/0207* (2013.01); *G05D 2201/0216* (2013.01); *Y10S 901/01* (2013.01)

(58) Field of Classification Search
USPC ........................................................ 700/216
See application file for complete search history.

(56) References Cited

U.S. PATENT DOCUMENTS 7,860,647 B2 12/2010 Amano
8,179,816 B1 5/2012 Vaidyanathan et al.
(Continued)

FOREIGN PATENT DOCUMENTS

TW 201024936 7/2010

OTHER PUBLICATIONS

Title: Robotic Systems and Methods U.S. Appl. No. 14/946,635, filed Nov. 19, 2015 Inventor: Joshua Lowy U.S. Pat. No. 9,527,217 Issue Date: Dec. 27, 2016.
(Continued)

*Primary Examiner* — Kyle O Logan
(74) *Attorney, Agent, or Firm* — Kwan & Olynick LLP (57) ABSTRACT A robot having a base with a moving mechanism configured to move the robot according to control instructions, a controller configured to move the robot within a predetermined area along a pathway area, a body supported on the base, a camera mounted on the body and controlled to capture photo images while traveling along the pathway area, wherein the robot is controlled to rotate its body about a point in the pathway area and use the camera to take a 360 degree photo image of the surrounding at the location. The photo image is analyzed to identify information related to the location.

12 Claims, 5 Drawing Sheets

Related U.S. Application Data (60) Provisional application No. 62/197,420, filed on Jul. 27, 2015.

(51) Int. Cl.

| | | |
|---|---|---|
| *B25J 5/00* | (2006.01) | |
| *B25J 9/16* | (2006.01) | |
| *B25J 19/00* | (2006.01) | |
| *H04N 5/225* | (2006.01) | |
| *H04N 5/232* | (2006.01) | |
| *G06T 1/00* | (2006.01) | |
| *G06Q 30/06* | (2012.01) | |
| *G05D 1/02* | (2006.01) | |
| *G06Q 10/08* | (2012.01) | |
| *G06F 3/0488* | (2013.01) | |

(56) References Cited

U.S. PATENT DOCUMENTS

| | | | |
|---|---|---|---|
| 9,246,573 B1* | 1/2016 | Gettings | H04B 7/155 |
| 9,411,337 B1* | 8/2016 | Theobald | B25J 9/00 |
| 9,527,217 B1 | 12/2016 | Lowy | |
| 2002/0198656 A1 | 12/2002 | Ford et al. | |
| 2005/0054332 A1 | 3/2005 | Sakagami et al. | |
| 2005/0097005 A1 | 5/2005 | Fargo | |
| 2007/0018811 A1* | 1/2007 | Gollu | G01C 21/005 340/539.13 |
| 2008/0077511 A1 | 3/2008 | Zimmerman | |
| 2009/0149992 A1 | 6/2009 | Ohno | |
| 2009/0265251 A1* | 10/2009 | Dunlap | G06Q 10/087 705/26.1 |
| 2010/0094463 A1* | 4/2010 | Okabayashi | B25J 5/00 700/264 |
| 2012/0173018 A1* | 7/2012 | Allen | G05D 1/0248 700/245 |
| 2012/0173139 A1 | 7/2012 | Judd et al. | |
| 2012/0226467 A1 | 9/2012 | Miller et al. | |
| 2012/0316989 A1* | 12/2012 | Wong | G06Q 30/06 705/26.9 |
| 2013/0141565 A1* | 6/2013 | Ling | H04N 7/18 348/135 |
| 2013/0230208 A1* | 9/2013 | Gupta | G01C 21/206 382/103 |
| 2013/0317642 A1* | 11/2013 | Asaria | G06Q 10/08 700/216 |
| 2014/0101885 A1* | 4/2014 | Ko | A47L 11/4066 15/319 |
| 2014/0244094 A1* | 8/2014 | Kim | G05D 1/021 701/23 |
| 2014/0277691 A1 | 9/2014 | Jacobus et al. | |
| 2014/0365251 A1 | 12/2014 | Tejima | |
| 2015/0032252 A1 | 1/2015 | Galluzzo et al. | |
| 2015/0100461 A1 | 4/2015 | Baryakar et al. | |
| 2015/0363758 A1* | 12/2015 | Wu | G06Q 20/201 705/20 |
| 2016/0129597 A1* | 5/2016 | Wang | B25J 5/00 700/259 |

OTHER PUBLICATIONS

TItle: Robotic Systems and Methods in Prediction and Presentation of Resource Availability U.S. Appl. No. 14/757,986, filed Dec. 24, 2015 Inventor: Riley Hitchcock, et al Statue: Docketed New Case—Ready for Examination Status Date: Sep. 22, 2016.

Titile: Systems and Methods to Provide Searchable Content Related to a Plurality of Locations in a Region in Connection with Navigational Guidance to the Locations in the Region U.S. Appl. No. 15/040,938, filed Feb. 10, 2016 Inventor: Riley Hitchcock, et al Status: Docketed New Case—Ready for Examination Status Date: Jun. 15, 2016.

Title: Systems and Methods to Determine the Locations of Packages and Provide Navigational Guidance to Reach the Packages U.S. Appl. No. 15/158,102, filed May 18, 2016 Inventor: Erik Kokkonen Status: Docketed New Case—Ready for Examination Status Date: Jul. 1, 2016.

Title: Systems and Methods to Predict Resource Availability U.S. Appl. No. 15/222,434, filed Jul. 28, 2016 Inventor: Brian Porter, et al Status: Application Dispatched from Preexam, Not Yet Docketed Status Date: Sep. 6, 2016.

European Patent Application No. 16181530.3, Search Report, dated Dec. 8, 2016.

Wikipedia, Decision tree learning, last modified on Jul. 28, 2016, retrieved on Jul. 28, 2016 from https://en.wikipedia.org/wiki/Decision_tree_learning.

Wikipedia, Ensemble learning, last modified on Jun. 1, 2016, retrieved on Jul. 28, 2016 from https://en.wikipedia.org/wiki/Ensemble_learning.

Wikipedia, Mode (statistics), last modified on Jul. 3, 2016, retrieved on Jul. 28, 2016 from https://en.wikipedia.org/wiki/Mode_(statistics).

Wikipedia, Random forest, last modified on Jul. 19, 2016, retrieved on Jul. 28, 2016 from https://en.wikipedia.org/wiki/Random_forest.

Wikipedia, Regression analysis, last modified on Jul. 3, 2016, retrieved on Jul. 28, 2016 from https://en.wikipedia.org/wiki/Regression_analysis.

Wikipedia, Statistical classification, last modified on Jul. 17, 2016, retrieved on Jul. 28, 2016 from https://en.wikipedia.org/wiki/Statistical_classification.

scikit-learn, User Guide, "skleam.ensemble.RandomeForestClassifier", section 3.2.4.3.1, © 2010-2014, retrieved on Aug. 2, 2016 from http://scikit-learn.org/stable/modules/generated/sklearn_ensemble.RandomForestClassifier.html.

"Australian Application Serial No. 2016206400, Office Action dated Nov. 14, 2017", 4 pgs.

"European Application Serial No. 16181530.3, Office Action dated Dec. 3, 2018", 5 pgs.

* cited by examiner

ROBOTIC SYSTEMS AND METHODS

RELATED APPLICATIONS

The present application is a continuation application of U.S. patent application Ser. No. 14/946,635, entitled "ROBOTIC SYSTEMS AND METHODS", filed on Nov. 19, 2015, which claims the benefit of the filing date of Prov. U.S. Pat. App. Ser. No. 62/197,420, filed on Jul. 27, 2015, the entire disclosures of which applications are hereby incorporated herein by references.

FIELD OF THE TECHNOLOGY

At least some embodiments of the present disclosure relate to robots having indoor location determination devices to guide their movements in a building structure.

BACKGROUND

U.S. Pat. App. Pub. No. 2009/0149992 discloses a robot capable of traveling within a predetermined pathway area.

U.S. Pat. App. Pub. No. 2010/0094463 discloses a robot having a position recognition section that recognizes a current position of the robot within a guide zone. The robot is controlled to move to each of guide locations in the guide zone. At each of the guide locations, the robot transmits contents information corresponding to the guide location to a mobile terminal held by a person to be guided near the robot.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 1:
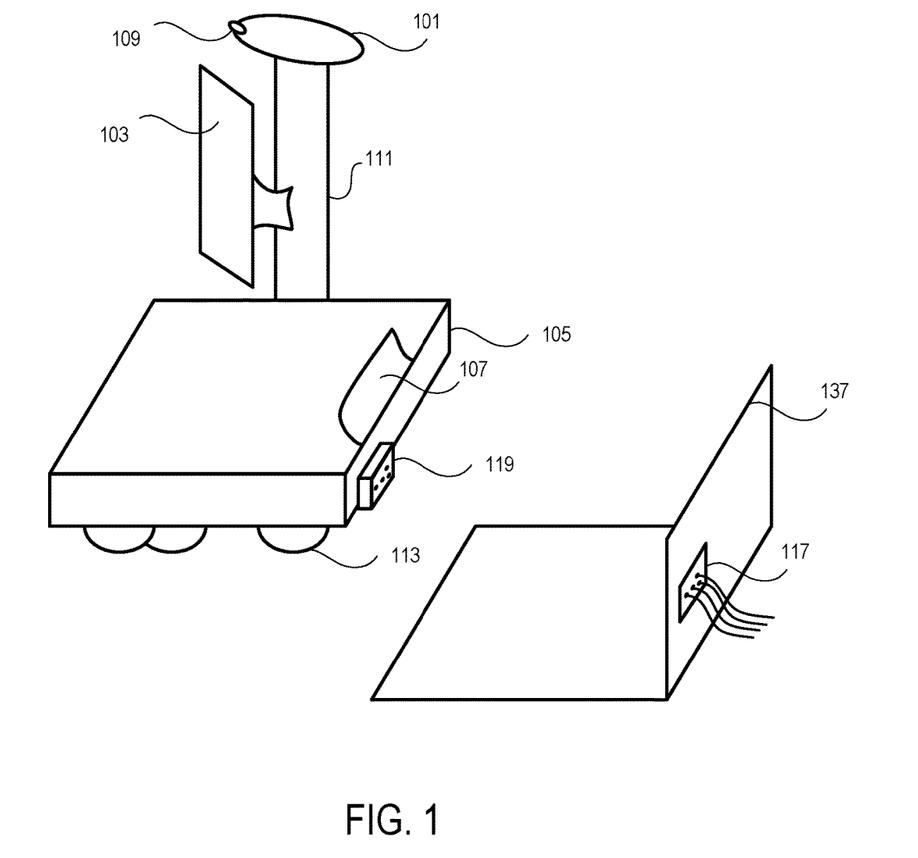
FIG. 1 shows a robot according to one embodiment.

FIG. 1 shows a robot according to one embodiment.

In FIG. 1, a robot (101) includes a base (105), a body (111), a touch screen (103) and a camera (109). In one embodiment, the robot (101) is programmable to travel within an area, such as a shopping mall, capture information and/or photo images, provide a user interface for interaction, and/or transport items.

In FIG. 1, the camera (109) is mounted directly on the body (111). In some alternative embodiments, the camera (109) is integrated with the touch screen (103). For example, the touch screen (103) can be implemented using a tablet computer having a camera (109) and running an operating system for mobile devices; and a mobile application running in the tablet computer is configured to control the operations of the robot (101). In some embodiments, the computer configured to control the operations of the robot (101) is integrated within the body (111) or the base (105). In some embodiments, the robot (101) includes a wireless communications device (e.g., an antenna and a transceiver for a wireless local area network, or a wireless personal area network) for a communication connection to a remote server.

In FIG. 1, the robot (101) has a touch screen (103) within which a controller of the robot (101) may be installed. Alternatively, the controller of the robot (101) may be disposed within the body (111) or the base (105).

In FIG. 1, the base (105) of the robot (101) includes a moving mechanism (113) controllable to move the robot (101) in a pathway area, such as the hallways in a shopping mall, or a sidewalk of a strip mall. For example, the moving mechanisms disclosed in U.S. Pat. App. Pub. No. 2009/0149992 or 2010/0094463 can be used, the disclosure of which is incorporated herein by reference.

In one embodiment, the moving mechanism (113) in the base (105) of the robot (101) is configured to rotate the robot (101) as a whole about a vertical line at a location to allow the camera (109) to take a 360 degree photo image of the surrounding.

In one embodiment, the base (105) and the body (111) are configured to allow the body (111) to rotate about a vertical line passing through the center of the base (105). Thus, the base (105) can be controlled to stay at location; and the body (111) can be controlled to rotate about the vertical line to take a 360 degree photo image of the surrounding. In a further embodiment, the camera (109) is mounted on a track on the body (111) and configured to move alone the track to take a 360 degree photo image of the surrounding.

The 360 degree photo image can be obtained via a camera taking a plurality of photo images while rotating about the vertical line and then digitally stitching the images together to form a photo image having a 360 degree view of the surrounding at the location of the robot (101).

Alternatively, the camera may capture one or more vertical lines of image pixels at a time while the robot (101) rotates about the vertical axis. The vertical lines captured at different time instances while the robot (101) is at different angles with respect to the vertical axis form an image having the 360 degree view of the surrounding.

In one embodiment, the robot (101) (or a server) is configured to analyze the image to extract information about the location, such as the advertisements, notices and/or deals posted on the store front of a retailer, the number of customers in the surrounding area, etc.

In one embodiment, the robot (101) further includes storage spaces (107) configured to carry items for delivery by the robot (101). Items stored in the storage spaces (107) can be secured with a locked door or latch to prevent theft, unauthorized access, temper, etc.

Figure 3:
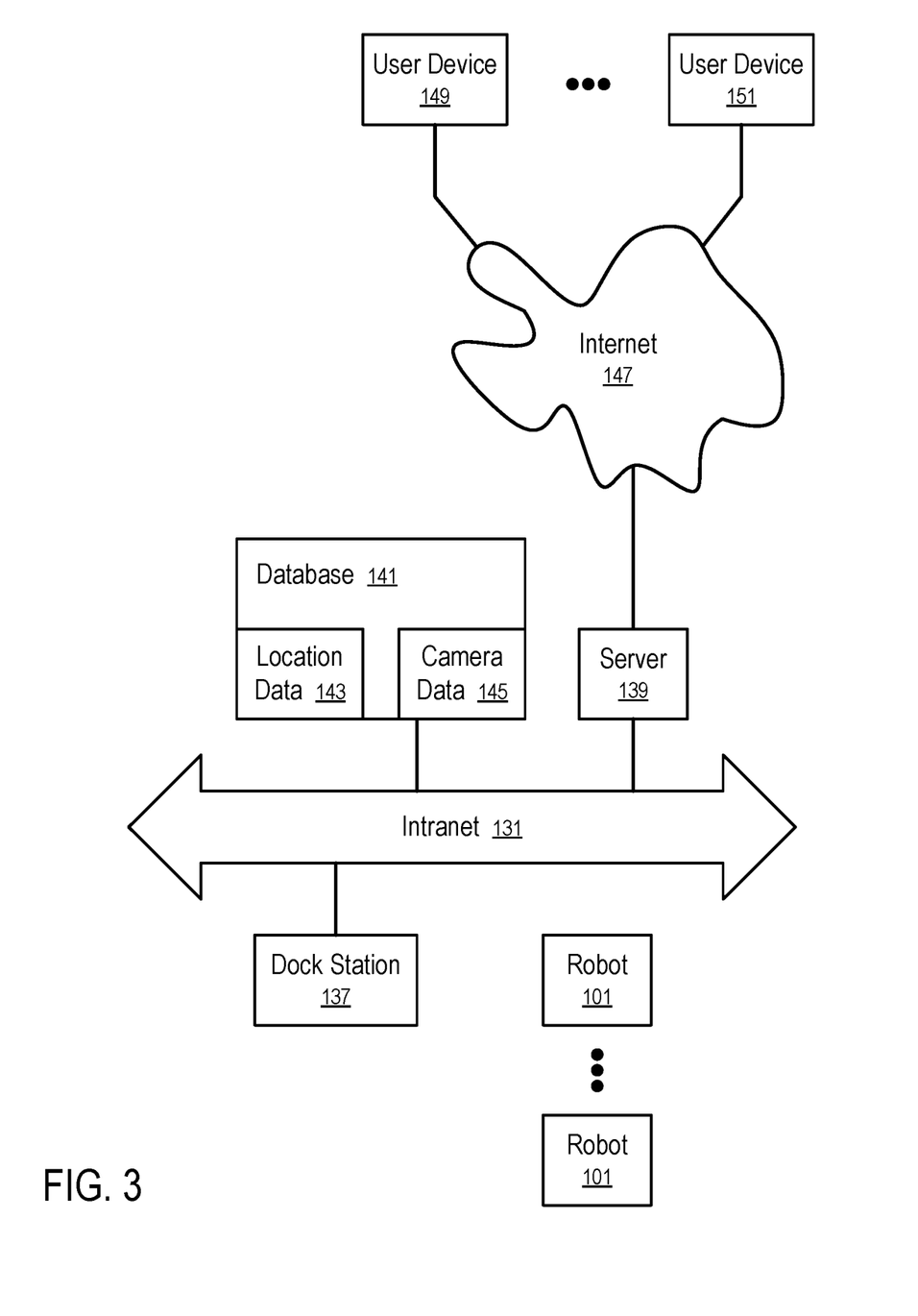
FIG. 3 shows a robotic system according to one embodiment.

In FIG. 1, the robot (101) has a connector (119) configured to be connected with the receptacle (117) of the dock station (137) to provide a wired connection to charge the battery of the robot (101) and/or provide a communication link for transferring data and/or instructions between the robot (101) and a server (e.g., as further illustrated in FIG. 3).

In one embodiment, the robot (101) includes an indoor position determination system that determines the position of the robot (101) within a building structure, such as a shopping mall. The controller of the robot (101) also includes map data of the shopping mall to guide the robot (101) to one or more locations programmed into the robot via a wired or wireless communication connection.

Figure 2:
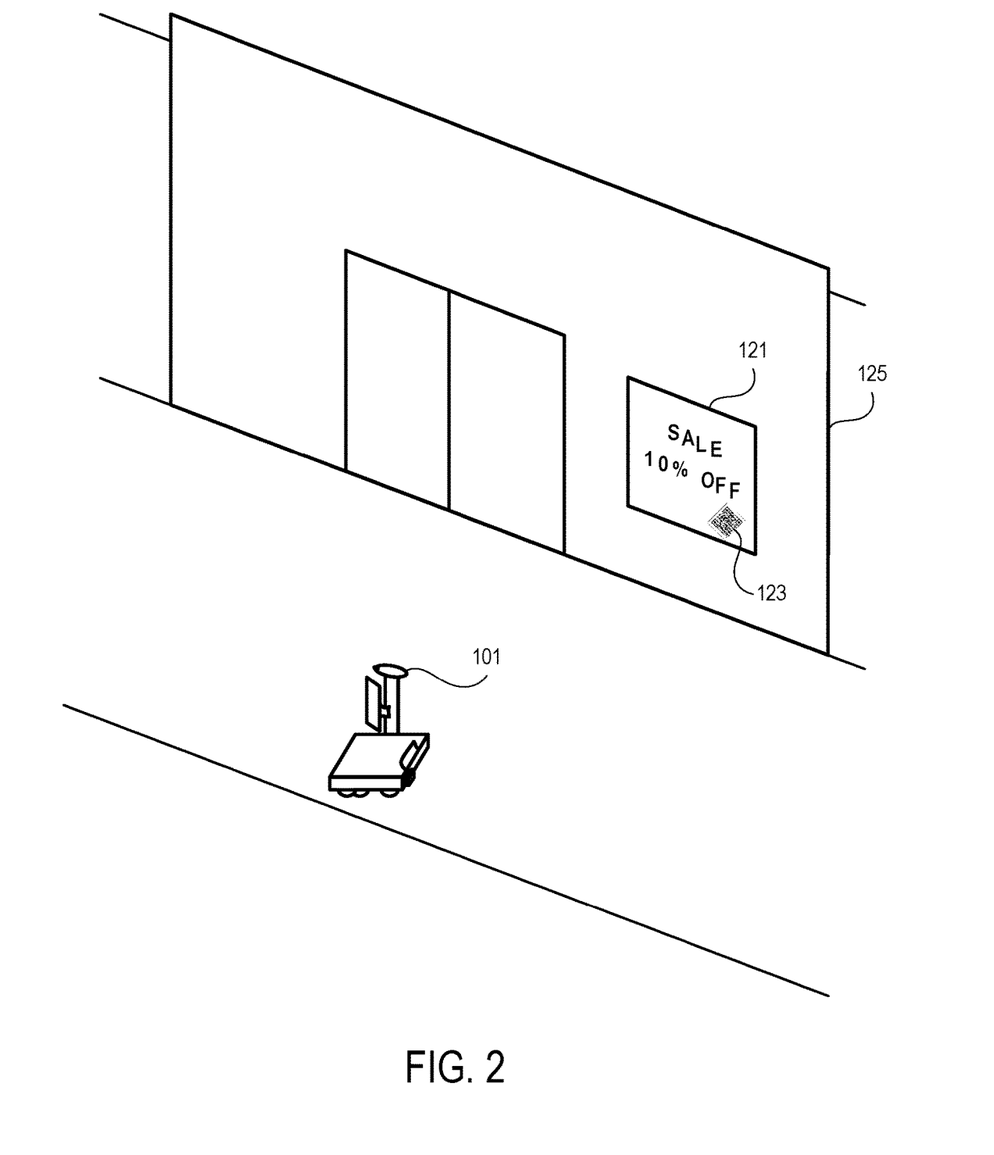
FIG. 2 illustrates an application of a robot according to one embodiment.

FIG. 2 illustrates an application of a robot according to one embodiment.

In FIG. 2, the robot (101) is configured to move inside a shopping mall. The robot (101) is instructed to take a 360 degree photo image of the surrounding at a location near a store front (125) and/or other locations near or in the store. For example, the store front (125) may have a posting (121) announcing a deal, such as a sales event, a discount offer, etc. The 360 degree photo image captured using the camera (109) of the robot (101) includes an image of the posting (121).

In one embodiment, optical character recognition (OCR) is performed on the image to extract the content of the posting. The postings may be filtered based on keywords, such as "sale" or "off", to obtain postings of a particular type, such as discount offers.

In one embodiment, the posting (121) may include a bar code (123); and the image of the bar code (123), as captured in the 360 degree photo image, is processed to determine the content of the bar code (123). For example, the bar code (123) may provide information about the posting (121) and/or an address of a web page from which further information about the posting (121) can be obtained.

Thus, the robot (101) can be instructed to move from a store front to another in a shopping mall, and take photo images that may contain the postings provided by the stores in the shopping mall. The images are processed by the robot (101) (or a server) to extract and identify postings of interest, such as discount offers.

In one embodiment, the robot (101) is used to bring consumers, retailers, and technology partners together in ways that enhance the shopping experience. Specifically, the robot (101) can be used to capture data to allow customers to find and purchase products.

For example, the robot (101) can be used to make product catalogs available for search on web and mobile, such as the integration of real time inventory feeds from retailers to offer product availability for each store. The robot (101) can be used to capture offer and product availability information using the camera (109) mounted on the robot (101).

For example, the robot (101) can further be used to assist product purchase and fulfillment. The robot (101) can be used to deliver goods to a central location for fulfillment. For example, in services such as hands free shopping and centralized fashion lounge, the customers can try on clothing from several different retailers in one location, after the robot (101) collects the goods from different retailers in a shopping mall and delivery the collected goods to the current retailer location of the customer.

For example, a customer may order the goods from retailers in a shopping mall via phone or internet; and the robot (101) can be used to collect the goods from the retailers and transport the goods to a logistics partner which further delivers the goods to the customer. Alternatively, the collected goods can be placed in a centralized pickup location in the shopping mall, where the customer can pick up the goods ordered from different retailers in the mall.

For example, when the robot (101) visits a retailer in a shopping mall, a person in the retailer store may interact with the robot (101) on behalf of the retailer. The touch screen (103) provides a user interface that communicates to the persons items to be placed inside the storage space (107) of the robot (101) and/or retrieved from the storage space (107). Thus, the robot (101) can transport goods from and/or to the retailer.

Further, the robot (101) may receive offers and/or product inventory information from the representative of the retailer. For example, a computing device of the representative (e.g., a smart phone, a tablet computer, a computer having a dock station) can be used to transmit the information to the robot (101) via a wireless or wired connection.

The robot (101) may automatically obtain certain offers and/or product inventory information via the camera (109) taking photo images of postings inside the store and/or the store front of the retailer.

In some embodiments, the robot (101) takes still images and/or video images of the retailer location to provide an updated feed of the arrangement and display of goods in the retailer store. Thus, the still images and the video images can be organized as a virtual tour of the retailer store accessible via internet.

In one embodiment, a user may use a mobile computing device (e.g., a smart phone, a digital media player, a tablet computer) to do "Hands Free Shopping" in which the user does not have to carry the items to be purchased and/or have been purchased around the shopping mall. The user may use the mobile computing device to select the items of interest for purchase. The mobile computing device (e.g., having a mobile application running therein) communicates the list of items purchased by the user to the computing system of the retailer (or a centralized server for the shopping mall). Based on the list of items received from the mobile computing device, the robot (101) travels to the stores in the mall, collects from the stores the items purchased by the user, and transports the items at a convenience location for pickup, such as in a pickup area in the parking lot.

In one embodiment, the robot (101) is used to capture images of offline information for the indexing of the offline information in the real world. For example, the robot (101) can be used to capture various types of data, from product information and availability to safety and security hazards within the shopping mall.

In one embodiment, the robot (101) has a cellular communications transceiver integrated within the touch screen (103), or disposed in the body (111). A communication link provided by the cellular communications transceiver can be used for the communication between the robot (101) and a remote server to process images, retrieve data, control the movement of the robot (101), and/or provide access to the storage spaces (107).

In one embodiment, the robot (101) has a position determination system configured to determine its position inside the shopping mall. The robot (101) is configured to identify the retailer stores based on its location within the shopping mall and/or beacon signals from the devices disposed in the retailer stores.

The robot (101) includes a wireless local area network transceiver (e.g., a WiFi transceiver). The robot (101) can be used to measure the signal strength of access points for the wireless local area networks within the shopping mall and generate a heat map of WiFi strength.

In one embodiment, the robot (101) is configured to perform autonomous scheduling of mapping and docking, without assistance from humans. For example, the robot (101) is programmed to un-dock at a defined frequency, collect/record mall data, re-dock and upload new content to be consumed via API remotely.

In one embodiment, the robot (101) includes a reader for radio frequency identification (RFID) tags. The robot (101) is configured to move into the retailer stores to scan RFID to obtain availability information items inside the store. For example, the scanning of the RFID tags allow the robot (101) to determine the presence of a particular item that is available for purchase at a particular location within a particular retailer store. The information is indexed for search, such that a user can quickly locate the item for inspection.

In one embodiment, the robot (101) includes a personal area network transceiver (e.g., Bluetooth transceiver) to perform a wireless docking connection with a dock station (137) when the robot (101) is with a predetermined distance to a docking station. The robot (101) may also move around the mall to measure Bluetooth signals and/or detect Bluetooth devices within the mall and correlate the detected signals/devices with the locations of the robot (101) at the time of the detections to generate a map of Bluetooth signals/devices within the mall.

In some embodiments, the robot (101) also includes a user interface for a customer to search for product availability information, reserve products, inspect a map of the mall, and obtain instructions to a particular location of a particular retailer where an item of interest to the user is located.

FIG. 3 shows a robotic system according to one embodiment.

In FIG. 3, an intranet (131) interconnects one or more dock station (e.g., 137), a server (139), and a database (141). The database (143) stores location data (143) (e.g., a digital map of the shopping mall, a commercial district), and camera data (145) uploaded from the robots (101).

The robots (101) are programmed to travel within a predetermined area (the shopping mall, a commercial district) autonomously and capture camera data (145) using their cameras (109). The camera data (145) is location tagged for correlation with the retailer locations identified in the location data (143).

In one embodiment, the robot (101) has a memory configured to store the camera data (145) before the data is updated to the database (141) via the dock station (137). A robot (101) may connect with the dock station (137) via a wired connection (e.g., via a USB connector) or a wireless connection (e.g., via Bluetooth or WiFi).

In FIG. 3, the server (139) provides a user interface (e.g., via a web server or a mobile application) that allows the users of the user devices (149, . . . , 151) to access the camera data (145).

For example, the 360 degree still or video images captured by the robot (101) allows a user of the user device (149) to view the shopping mall through the camera (109) of the robot (101) and thus obtain a virtual tour of the shopping mall. In one embodiment, the user interface is configured to receive instructions from a user to approach one of a set of authorized locations within the shopping mall to obtain a still image or a real time video feed from the camera (109) of the robot (101). The real time video, when presented via a virtual reality display device, provides a virtual reality experience in the shopping mall from a remote location. Thus, the robot (101) becomes a virtual representative of the user in the real world shopping mall, where the user may explore the merchandises provided in the shopping mall and make selections and purchases. A representative of a store may assist the robot (101) in completing certain operations, such as picking up an item for inspection, and purchase. The robot (101) transports the purchased items to an centralized location for shipping to the customer. Optionally, the customer may choose to travel to the centralized location to pick up the purchased items.

Further, in one embodiment, the server (139) (or the robot (101)) processes the camera data (145) to obtain postings (121) provided in a printed form on certain surfaces within the mall. For example, the discount offers are recognized via OCR and/or bar code; and thus, a discount offers can be communicated to the user devices (151) in various forms, such as advertisements, search results, a list of offers for browsing, etc.

Figure 4:
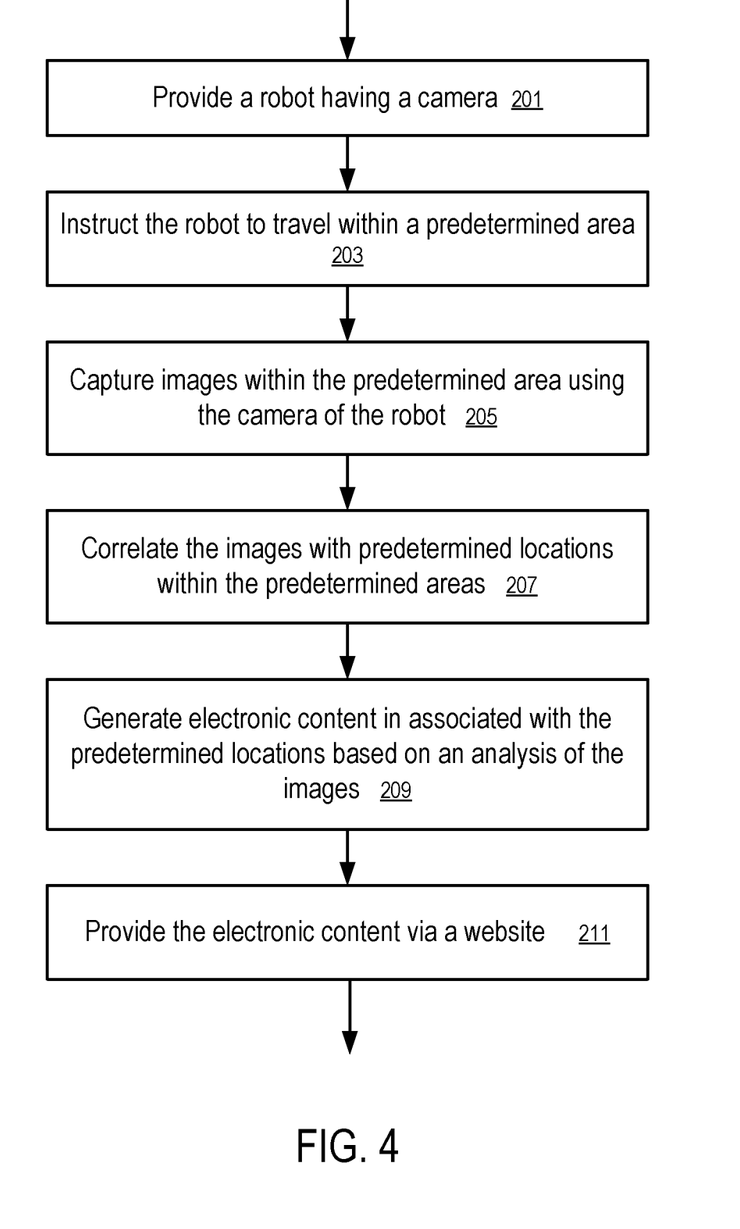
FIG. 4 shows a robotic method according to one embodiment.

FIG. 4 shows a robotic method according to one embodiment. For example, the method of FIG. 4 can be performed in a system illustrated in FIG. 3, using a robot (101) illustrated in FIG. 1 in an environment illustrated in FIG. 2.

In one embodiment, a robotic system is configure to: provide (201) a robot (101) having a camera (109); instruct (203) the robot (101) to travel within a predetermined area; capture (205) images within the predetermined area using the camera (109) of the robot (101); correlate (207) the images with predetermined locations within the predetermined areas; generate (209) electronic content in associated with the predetermined locations based on an analysis of the images; and provide (211) the electronic content via a website.

Figure 5:
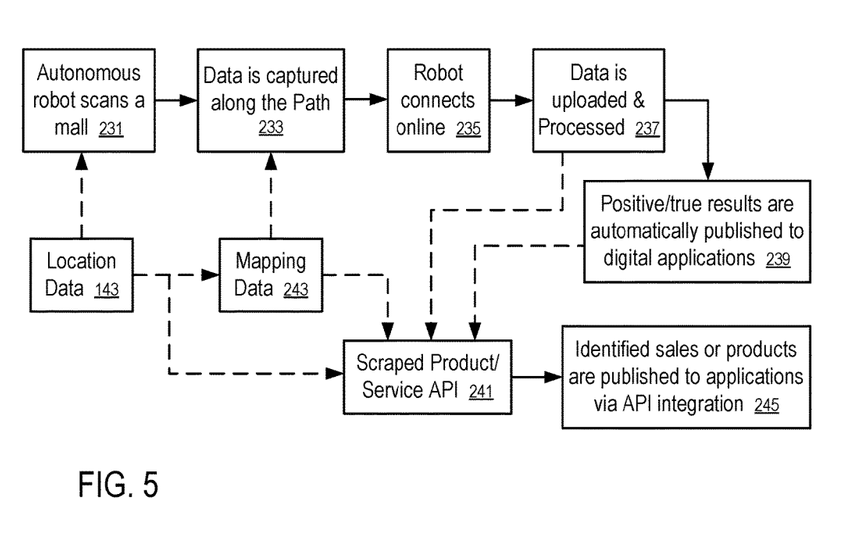
FIG. 5 shows an operation and data flow according to one embodiment.

FIG. 5 shows an operation and data flow according to one embodiment.

In FIG. 5, the location data (143) and the mapping data (243) of a shopping mall are used to guide the autonomous robot (101) to scan the shopping mall. The location data (143) may include floor plan and identification of stores. The mapping data (243) may include previously captured video and/or still photo images, WiFi and/or RFID signals. The robot (101) scans the mall using the camera (109) and/or transceivers for WiFi, Bluetooth, beacons, RFID etc. After the robot (101) connects (235) online, the data captured along the traveling path of the robot (101) is uploaded and processed (239) in accordance with an API (241) designed for uploading and processing the data collected by the robot (101) along the path. Data pertinent to products (sales, inventory, etc.) that is recognized during server-processing via the various signals (e.g., Imagery & OCR, Bluetooth, RFID, etc.) is correlated with the service presence and/or location data to generate content that is published (239) automatically via the API (241). For example, the sales or products identified from the scanned data collected by the robot (101) can be published (245) to applications (e.g., consumer mobile application) via API integration.

Figure 6:
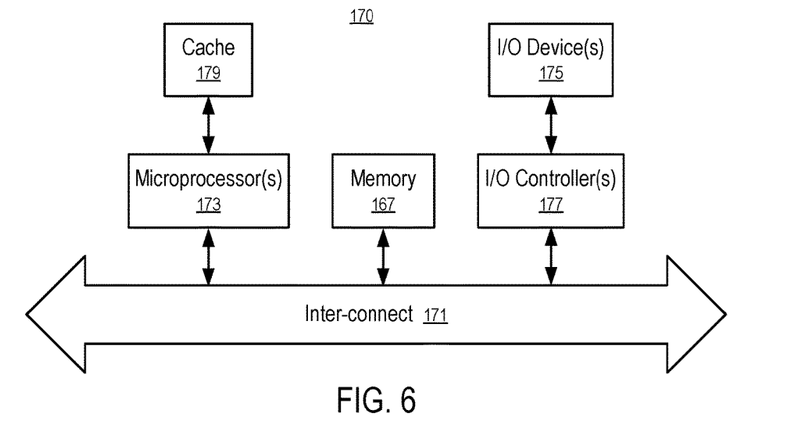
FIG. 6 shows a data processing system that can be used to implement some components of a robotic system according to one embodiment.

FIG. 6 shows a data processing system that can be used to implement some components of a robotic system according to one embodiment. For example, the data processing system of FIG. 6 can be used to implement each of the controller of the robot (101), the dock station (137), the server (139), and/or the database (141) discussed above.

While FIG. 6 illustrates various components of a computer system, it is not intended to represent any particular architecture or manner of interconnecting the components. One embodiment may use other systems that have fewer or more components than those shown in FIG. 6.

In FIG. 6, the data processing system (170) includes an inter-connect (171) (e.g., bus and system core logic), which interconnects a microprocessor(s) (173) and memory (167). The microprocessor (173) is coupled to cache memory (179) in the example of FIG. 6.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A server system in communication with a robot, wherein the robot comprises a transceiver configured to receive wireless signals to determine a plurality of locations of the robot with respect to a plurality of stores that are separated and housed within a building structure, a base having a moving mechanism configured to move the robot according to control instructions received in the robot, a controller configured to provide control instructions for moving the robot to the stores, a body supported on the base, and a camera mounted on the body and controlled to capture photo images of the stores, including an announcement posted at a first one of the stores and to communicate such photo images to the server, the system comprising:

at least one processor and memory that are configured to:

receive the photo images, including the announcement at the first store, and the locations, including the first store's associated location, from the robot, analyze the photo images, including the announcement, so as to extract information, including information regarding an offer of one or more products to purchase at the first store, and generate and publish, to a mobile application via an application programming interface (API), content based on the extracted information and received locations, wherein the generating and publishing of the content comprises providing a user interface on a mobile device associated with a customer, the user interface providing one or more components for presenting the offer and instructions for navigating to the first store's location based on the received first store's location.

2. The system of claim 1, wherein the photo image comprise 360 degree photo images.

3. The system of claim 1, wherein some of the images are captured inside some of the stores and the extracted information includes product inventory data.

4. The system of claim 1, wherein the one or more components of the user interface for the customer to search for product availability are provided based on the product inventory data of the extracted information.

5. The system of claim 1, wherein the information is extracted and the content generated based on optical character recognition and matching of predetermined keywords.

6. The system of claim 1, wherein the information is extracted and the content generated based on processing a bar code in the photo image captured by the camera of the robot.

7. The system of claim 1, wherein the server is configured to publish the content in association with a map of the building structure.

8. The system of claim 1, wherein the building structure is a shopping mall.

9. The system of claim 1, wherein the robot is configured to travel to a plurality of store fronts outside a plurality of the stores in the building structure to capture 360 degree photo images of the store fronts, wherein the announcement is located on one of the store fronts.

10. The system of claim 1, wherein the locations are determined based on wireless signals received by the robot's transceiver from a plurality of wireless communication devices disposed in the building structure.

11. The system of claim 10, wherein the locations are determined based on the signal strength levels of the wireless signals.

12. The system of claim 10, wherein the server is configured to present at least one of:

a map of the signal strength levels in the building structure; and a map of the wireless communications devices in the building structure.

* * * * *